May 12, 1936.   P. SPENCE   2,040,109
TEMPERATURE CONTROL DEVICE
Original Filed May 19, 1931   4 Sheets-Sheet 3
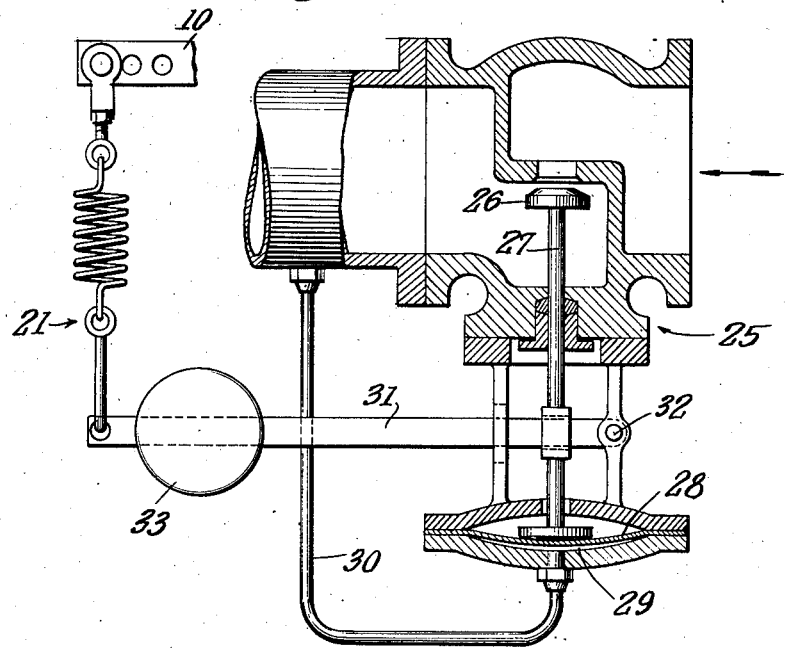
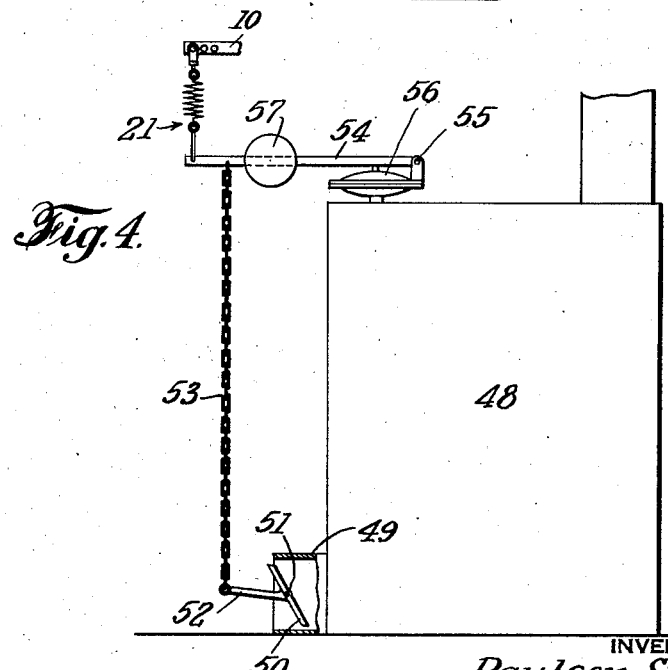
INVENTOR
Paulsen Spence
BY
Mitchell & Bechert
ATTORNEY May 12, 1936.  P. SPENCE  2,040,109
TEMPERATURE CONTROL DEVICE
Original Filed May 19, 1931   4 Sheets-Sheet 4

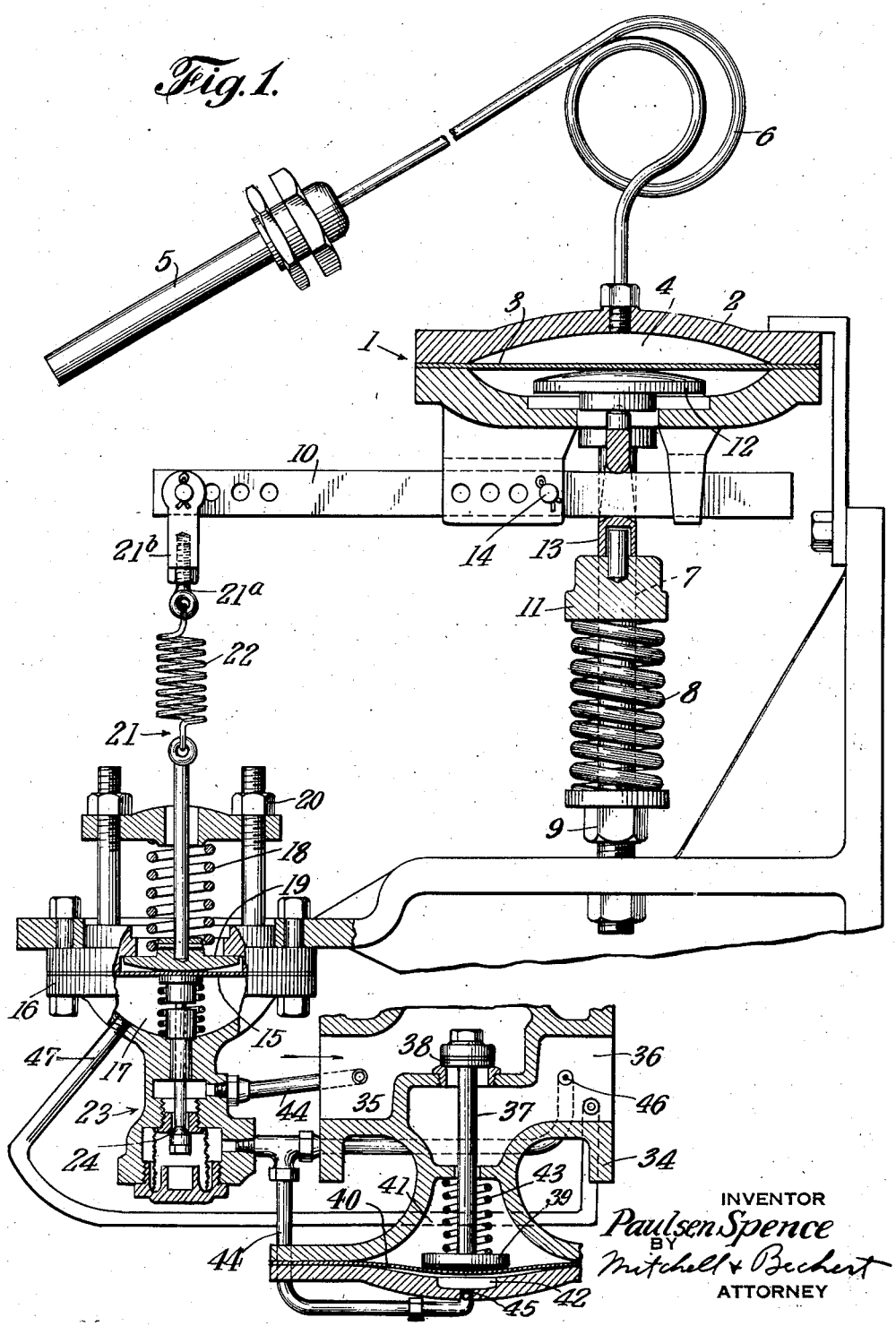

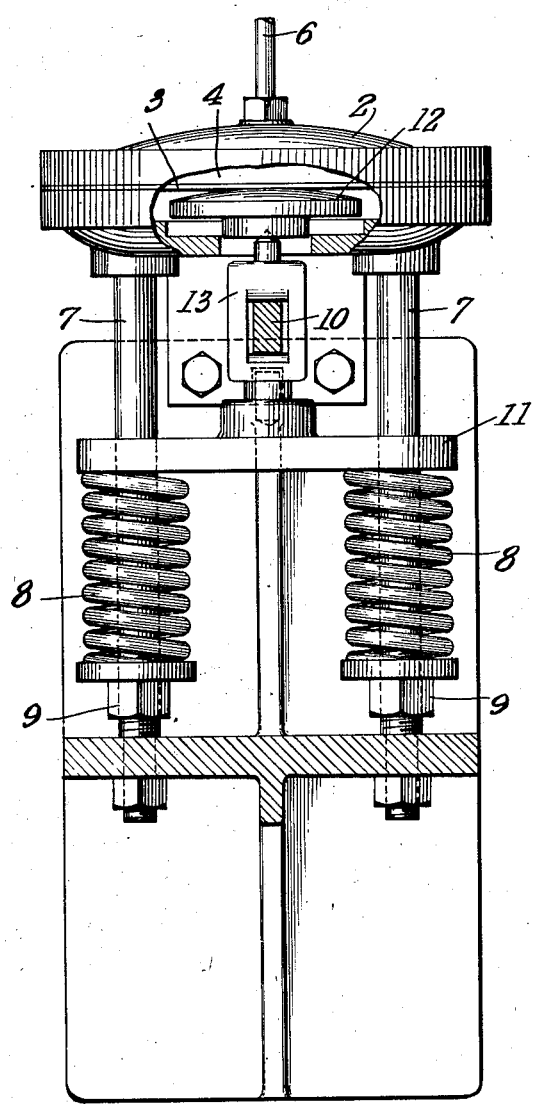

INVENTOR
Paulsen Spence
BY
Mitchell & Bechert
ATTORNEY

Patented May 12, 1936

2,040,109

UNITED STATES PATENT OFFICE 2,040,109

TEMPERATURE CONTROL DEVICE

Paulsen Spence, East Orange, N. J.

Application May 19, 1931, Serial No. 538,430
Renewed January 26, 1935

10 Claims. (Cl. 236—80)

My invention relates to a temperature control device.

It is an object of my invention to provide an improved thermostatic device for altering the amount of heat emitted by a heating element in accordance with the temperature at a particular point.

It is a further object of my invention to provide means for automatically altering the loading of a fluid pressure actuated means for the control of heating apparatus so that the loading will be varied by the temperature at some particular point.

Other objects and features of the invention will be pointed out or will become apparent upon a reading of the specification.

Briefly stated, I accomplish these objects by providing a fluid pressure actuated means which operates a valve or switch, and which is actuated by fluid pressure in one direction and by a loading means in the opposite direction, and by providing thermostatic means for altering the loading of the pressure actuated means.

My invention is particularly useful in connection with a steam heating system supplied with steam through a pressure reducing valve in which it is desired to increase the steam pressure as the temperature of the outside air decreases. My invention is also useful for controlling fuel oil supply pumps used with boilers and furnaces, vacuum pumps used with vacuum heating systems, the dampers of furnaces, and for the control of heating apparatus generally.

In the drawings which show, for illustrative purposes only, preferred forms of the invention—

Fig. 1 is a central sectional view, partly in elevation, of an automatic reducing valve having a spring loaded pilot valve and in which my invention is embodied by means whereby the loading of the valve is varied inversely with the temperature at a particular point.

Fig. 2 is a view in elevation, partially in section, of the thermostat taken at right angles to the view shown in Fig. 1.

Fig. 3 is a central sectional view, partly in elevation, of a weight loaded reducing valve which embodies features of my invention.

Fig. 4 is a view in elevation, partly in section, of an arrangement embracing features of my invention for operating the damper of a furnace so that the setting of the damper is automatically varied with the temperature at a particular point.

Figure 5:
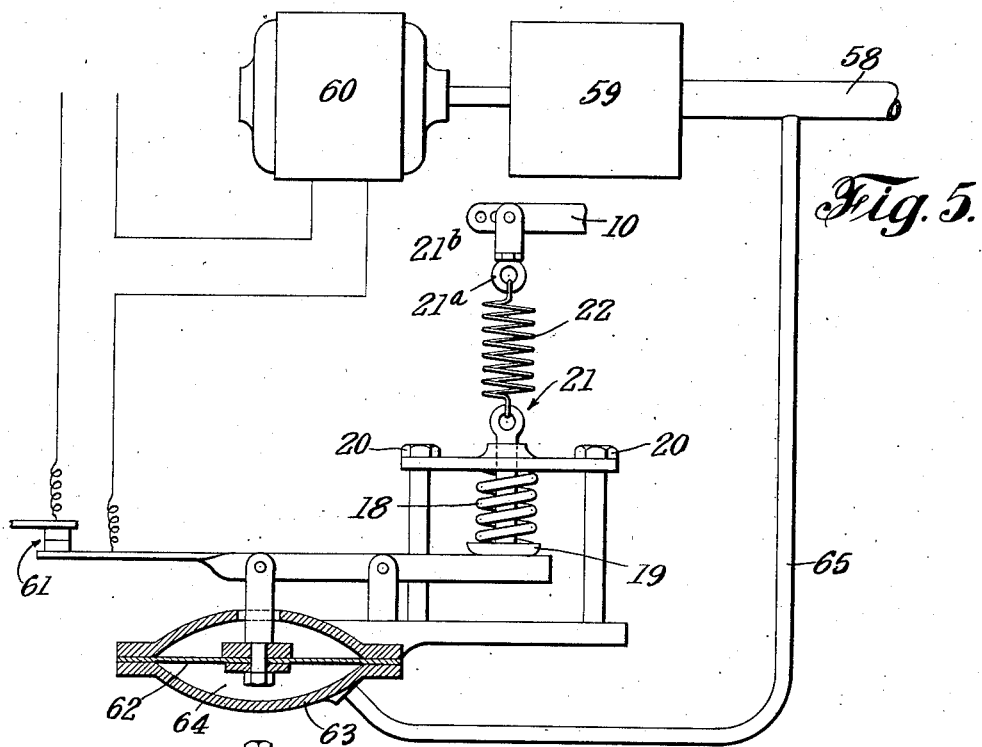
Fig. 5 is a view in elevation, partly in section, of an arrangement embracing features of my invention for controlling an electrically operated vacuum pump in a vacuum heating system so that the vacuum is varied inversely with the temperature at a particular point.

In Fig. 1, I represents generally a thermostat. In the form shown in the drawings the thermostat is a pneumatic thermostat having a body 2, a flexible diaphragm 3, and a diaphragm chamber 4. A thermostat bulb 5 is connected by means of a pipe 6 to the diaphragm chamber 4. The parts 4, 5, and 6 together form a closed chamber in which is confined a quantity of a vapor tension element which expands as its temperature increases. The thermostat bulb 5 will ordinarily be placed where it is exposed to the temperature of the outside air, but it may be placed in any other location the temperature at which is to control the valve. Attached to the body 2 are one or more spring rods 7—7 which are surrounded by spiral springs 8—8, which are supported by adjusting nuts 9—9, which are threaded on the rods 7—7. A lever 10, is operated in one direction by the pressure on the diaphragm 3 and in the opposite direction by the springs 8—8. Supported by the springs 8—8 is a spring yoke 11, and coacting with the diaphragm 3 is a disk 12. A lever yoke 13 is held between the spring yoke 11 and the disk 12 and has an opening therein through which the lever 10 passes. The lever 10 is pivoted to the body 2 in any convenient manner as by a pin 14 which passes through holes in the body 2 and in the lever 10. A number of these holes are provided to adjust the leverage. The body 2 provides a positive stop for the diaphragm 3. The springs 8—8 may therefore be placed under an initial tension by means of the adjusting nuts 9—9.

The thermostat I controls the loading of a fluid pressure actuated means which in turn actuates a switch or valve which controls the flow of electricity or of a fluid such as steam, water, or air. 15 represents a fluid pressure actuated means. In the particular form shown, the pressure actuated means 15 is a flexible diaphragm which is secured to a body 16. 17 is a diaphragm chamber which may be supplied with pressure fluid from any source. The fluid pressure in the chamber 17 serves to actuate the pressure actuated means 15 in one direction. The fluid pressure actuated means 15 is operated in the opposite direction by suitable loading means such as a weight or spring. In the form shown in Fig. 1 this loading means consists of a compression spring 18 which is interposed between the body 16 and a disk 19 which coacts with the diaphragm 15. The compression spring 18 is assembled with an initial tension which may be varied by means of the adjusting nuts 20—20. By means of a thermostat the loading of the fluid pressure actuated means 15 is altered independently of the fluid pressure in the chamber 17. Thereby the normal loading of the fluid pressure actuated means 15 is altered. In the form shown in the drawings, the loading of the diaphragm 15 is altered by the thermostat 1 by means of a connection designated generally by 21 which connects the disk 19 and the lever 10. In the form shown, this connection includes a tension spring 22 and also means for adjusting the length of the connection 21. The adjustment of the length of the connection 21 may be made by screwing a screw 21a which forms part of the connection 21 into or out of an internally threaded sleeve 21b which also forms part of the connection 21. The tension spring 22 is a comparatively light spring as compared with the springs 8—8. Its use allows the diaphragm 15 and the disk 19 to oscillate in accordance with the pressure in the diaphragm chamber 17 without causing any substantial corresponding movement of the lever 10 or of the parts of the thermostat 1. The fluid pressure actuated means 15 may operate a valve or a switch. In Fig. 1 it operates a valve designated generally by 23 and having a valve head 24 and a valve body which is part of the body 16.

Let us suppose that the inlet chamber of the valve 23 is connected to a source of high pressure steam and that the outlet chamber of the valve is connected to a heating system, and that it is desired to regulate the pressure in the heating system in inverse relation to the temperature of the outside air, to which the thermostat bulb 5 is exposed, so that there will be a maximum pressure in the heating system when the temperature of the outside air is 0° F. and so that there will be a minimum pressure when the temperature of the outside air is 50° F. In such case the diaphragm chamber 17 will be connected by means of a pipe to the outlet chamber of the valve. The tension of the compression spring 18 will be adjusted so as to permit the valve to close when the pressure at the outlet side of the valve and in the diaphragm chamber 17 reaches the maximum pressure which is desired in the heating system. The tension of the springs 8—8 will be adjusted so as to maintain the desired minimum pressure in the heating system when the temperature of the outside air is 50° F. The length of the connection 21 between the disk 19 and the lever 10 will be adjusted so that there is no force acting on the tension spring 22 when the temperature of the outside air is 0° F. With this arrangement, it is apparent that when the temperature of the outside air is 0° F. the full initial tension of the compression spring 18 is available to open the valve against the pressure in the diaphragm chamber 17 so as to maintain in the heating apparatus supplied by the valve the desired maximum pressure. On the other hand, when the temperature of the outside air is greater than 0° F. the pressure of the vapor tension element on the diaphragm 3 will operate the lever 10 so as to pull upward upon the disk 19, thereby reducing the loading of the valve 23 and reducing the pressure in the heating system. When the temperature of the outside air reaches 50° F. the pressure of the vapor tension element on the diaphragm 3 will be sufficient so that the upward pull of the lever 10 on the disk 19 will offset the push of the compression spring 18 so that the desired minimum pressure in the diaphragm chamber 17 will be sufficient to close the valve.

In Fig. 3, 25 is a weight loaded pressure reducing valve. 26 is a valve head and 27 is a valve stem. The valve head 26 is operated in one direction by a pressure actuated means 28 which, in the form shown, is a flexible diaphragm. 29 is a diaphragm chamber which is connected by means of a pipe 30 to the outlet side of the valve. The valve head 26 is operated in the opposite direction by means of an arm 31 which is pivoted at 32 and which is made to actuate the valve stem 27 in any convenient manner as by being passed through a slot therein. 33 is a weight which is adjustable longitudinally of the arm 31. 21 is a connection such as is shown in Fig. 1 which connects a thermostat such as shown in Figs. 1 and 2 to the arm 31.

The operation of the device shown in Fig. 3 is as follows—

Let us suppose that the outlet side of the valve 25 is connected to a steam heating system and that it is desired that there shall be a maximum pressure in the system when the temperature of the outside air is 0° F. and that there shall be a minimum pressure in the system when the temperature of the outside air is 50° F. The setting of the weight 33 will be adjusted so as to permit the valve to close when the pressure at the outlet side of the valve and in the diaphragm chamber 29 reaches the maximum pressure which is desired in the heating system. The tension of the thermostat springs 8—8 will be adjusted so as to maintain the desired minimum pressure in the heating system when the temperature of the outside air is 50° F. The length of the connection 21 will be adjusted so that there will be no force transmitted by the connection when the air temperature is 0° F. With this arrangement it is apparent that when the temperature of the outside air is 0° F. the weight 33 will open the valve against the pressure in the diaphragm chamber 29 so as to maintain in the heating apparatus supplied by the valve the desired maximum pressure. On the other hand, when the temperature of the air is greater than 0° F. the thermostat which is connected to the connection 21 will exert an upward pull on the arm 31, thereby reducing the loading of the valve 25 and reducing the pressure in the heating system. When the temperature of the air reaches 50° F. the upward pull of the thermostat on the arm 31 will offset the effect of the weight 33 so that the desired minimum pressure in the diaphragm chamber 29 will be sufficient to close the valve.

It will be seen that by the use of temperature control devices such as shown in Fig. 1 or in Fig. 3 the pressure on the outlet side of the valve can be varied in inverse relation to the temperature, thereby accomplishing an automatic regulation of the pressure in the heating system so as to maintain an equable temperature in the space which is heated by the system.

Either of the valves which I have described and which are illustrated in Figs. 1 and 3 may be used as a pilot valve for controlling a main pressure reducing valve as shown in Fig. 1. 34 represents the body of a main valve which may be of any type but is preferably of the type disclosed in my co-pending application No. 366,837 filed May 29, 1929. The body 34 has an inlet chamber 35 and an outlet chamber 36. 37 is a valve stem to which is attached a valve head 38 and a disk 39. Coacting with the disk 39 is a flexible diaphragm 40. The diaphragm is contained in a diaphragm chamber which may be integral with the body 34. The diaphragm divides the diaphragm chamber into two chambers 41 and 42, which, for convenience, I shall term the upper and lower diaphragm chambers respectively. A light spring 43 may be placed preferably in one of the diaphragm chambers to keep the disk 39 in contact with the diaphragm 40, and for the purpose of closing the valve in case the pressure in the inlet and outlet chambers 35 and 36 should for any reason become equalized. Communication is provided between the outlet chamber 36 and the diaphragm chamber 41 by loosely fitting the valve stem 37 in the body 34 so that the fluid in the outlet chamber 36 will leak past the valve stem 37 into the diaphragm chamber 41. The outlet side of the valve is connected by means of a pipe to a heating element or to a heating system. 44 is a fluid conducting means or pipe leading from the inlet chamber 35 to the diaphragm chamber 42 and also to the outlet chamber 36. The openings from the pipe 44 to the chambers 42 and 36 are the orifices 45 and 46 respectively. The pilot valve 23 is interposed in the fluid conducting means 44. 47 is a control pipe leading from the outlet chamber 36 to the diaphragm chamber 17.

As previously pointed out, any increase in the temperature of the outside air will decrease the loading of the pilot valve 23. Any decrease in the loading of the pilot valve 23 will permit the pilot valve to partially close, thus cutting down the supply of pressure fluid to the lower diaphragm chamber 42. The pressure of the fluid in the lower diaphragm chamber 42 will thereafter be reduced by drainage to the outlet chamber 36 through the pipe connecting the orifices 45 and 46, thus allowing the main valve to partially close. Similarly, any decrease in the air temperature will cause an increase in the loading of the pilot valve, an increase in the flow of pressure fluid through the pipe 44, and an increase in the opening of the main valve.

In Fig. 4, 48 represents a steam boiler which is equipped with a valve or damper for regulating the flow of air to the furnace or the flow of gases from the furnace to the chimney. In the form shown 49 represents the body of such a valve or damper and 50 represents the valve head or damper proper. The valve as shown is positioned so as to regulate the flow of air to the furnace. The valve head 50 is pivoted at 51. Fixedly attached to the valve head 50 is a weighted arm 52 which normally tends to hold the valve open. 53 is a connection between the arm 52 and a lever 54 which is pivoted at 55. The lever 54 is actuated in a direction to close the valve by a fluid pressure operated actuator 56 which is operated by steam from the boiler 48. 57 is a weight which is adjustable longitudinally of the arm 54. 21 is a connection such as is shown in Fig. 1 which connects a thermostat such as shown in Figs. 1 and 2 to the lever 54.

It will be seen that as the temperature to which the thermostat bulb 5 is exposed is increased, the left hand end of the lever 10 will be moved upward thereby exerting a force on the lever 54 which will tend to close the valve.

The operation of the device is as follows:

Let us suppose that it is desired to maintain a steam pressure in the boiler 48 of 10 lbs. per square inch when the temperature of the outside air is 0° F. and that it is desired to maintain a pressure of 3 lbs. per square inch when the temperature of the outside air is 50° F. The setting of the weight 57 will be adjusted so as to permit the valve to close when the pressure in the boiler reaches a pressure of 10 lbs. per square inch. The tension of the thermostat spring 8—8 will be adjusted so as to maintain a pressure of 3 lbs. per square inch at 50° F. The length of the connection 21 will be adjusted so that there will be no force transmitted by the connection when the air temperature is 0° F. With this arrangement it is apparent that when the temperature of the outside air is 0° F. the weight 57 will move the lever 54 downward against the pressure exerted by the pressure actuated means 56 so as to permit the valve to open widely until the pressure in the boiler reaches 10 lbs. per square inch. On the other hand, when the temperature of the air is greater than 0° F. the thermostat which is connected to the connection 21 will exert an upward pull on the lever 54, thereby permitting the valve to be closed by a lesser pressure in the pressure actuated means 56. When the temperature of the air reaches 50° F. the upward pull of the thermostat on the arm 54 will off-set the effect of the weight 57 to such an extent that a pressure of 3 lbs. per square inch in the pressure actuated means 56 will be sufficient to close the valve.

In Fig. 5 I show a temperature control device for a vacuum heating system having an electrically operated vacuum pump. 58 represents the vacuum return pipe from the radiators. 59 is a vacuum pump which is operated by the electric motor 60. The motor 60 is controlled by an electric switch 61 which is operated by the fluid pressure actuated means 62. In the form shown the pressure actuated means 62 is a diaphragm which is attached to a body 63 so as to form a diaphragm chamber 64. 65 is a pipe connection leading from the vacuum return pipe 58 to the diaphragm chamber 64. The pressure actuated means 62 is operated in the direction to close the switch by the loading means 18, and is operated in the direction to open the switch by the differential pressure between the pressure of the atmosphere and the pressure in the diaphragm chamber 64 which is the same as the pressure in the vacuum return pipe. In the form shown, the loading means 18 is a spring the tension of which may be adjusted by means of the adjusting nuts 20—20. A thermostat such as shown in Fig. 1 is connected to the loading means 18 by means of the connection 21 and the disk 19 so as to increase the loading of the pressure actuated means 62 when the air temperature decreases and to decrease the loading when the air temperature increases.

Let us suppose that it is desired to have a 20 inch vacuum in the heating system when the temperature of the outside air is 0° F., and to have no vacuum in the system when the temperature of the outside air is 50° F. In such case the tension of the spring 18 is adjusted so that the switch 61 will open when there is a 20 inch vacuum in the diaphragm chamber 64. The springs of the thermostat shown in Fig. 1 are then adjusted so that at 50° F. there will be no loading on the pressure actuated means 62, or in other words, so that at that temperature the thermostat will counterbalance the effect of the spring 18. The length of the connection 21 is then adjusted so that at 0° F. there will be no tension on the spring 22 and consequently no force transmitted by the connection 21.

The operation of the device shown in Fig. 5 is as follows—

At 0° F. the switch 61 will be closed by the loading means 18 and will remain closed until there is a 20-inch vacuum in the vacuum return line, when the switch will open. At 50° F. the loading means 18 will be counterbalanced and the switch will be opened by any differential pressure on the diaphragm 62. At any intermediate temperature the loading of the pressure actuated means 62 will correspond with the air temperature in an inverse relationship so that the vacuum in the heating system will be gradually decreased as the temperature increases.

Figure 6:
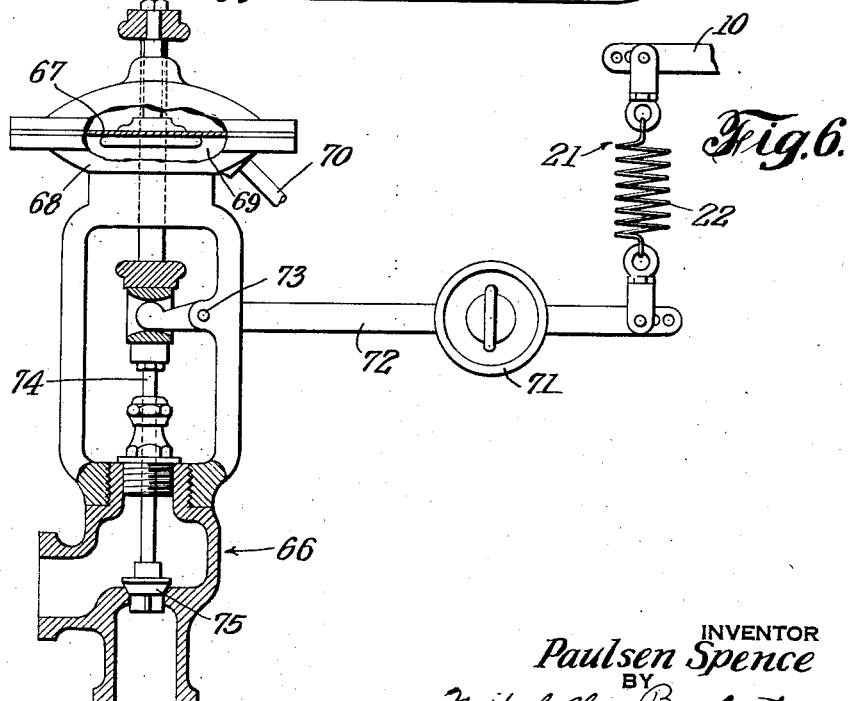
Fig. 6 is a view in elevation, partly in section, of a modification of the device shown in Fig. 5 so as to provide temperature control for a vacuum heating system having a steam operated vacuum pump.

In Fig. 6 I show a modification of the device shown in Fig. 5 so as to provide a temperature control for a vacuum heating system having a steam operated vacuum pump. 66 represents a valve located in a steam pipe which supplies a steam operated vacuum pump. 67 represents a fluid pressure actuated means for actuating the valve 66. In the form shown the pressure actuated means 67 is a diaphragm which is attached to a body member 68 so as to form a diaphragm chamber 69. 70 is a pipe connecting the vacuum return pipe of the vacuum system to the diaphragm chamber 69. The pressure actuated means 67 is operated in the direction which permits the valve 66 to open by a loading means 71. In the form shown, the loading means 71 is a weight which is slidably mounted upon an arm 72 which is pivoted at 73 and which coacts with a valve stem 74 which coacts with the diaphragm 67 and is connected to a valve head 75. A thermostat such as shown in Fig. 1 is connected to the arm 72 by means of a connection 21 which includes an extension spring 22. The operation of the device shown in Fig. 6 is analogous to that which has already been described in connection with the device shown in Fig. 5.

My invention is also applicable for controlling an oil burning steam heating system in which the oil pump is electrically or steam operated. If an electrically operated oil pump is used, apparatus such as shown in Fig. 5 can be used, except that an oil pump must be substituted for the vacuum pump 59 and the fluid pressure of the steam from the heating system must be applied to the top of the pressure actuated means 62. In such case, if it is desired to maintain a pressure of 15 lbs. per square inch in the heating system when the temperature of the outside air is 0° F. and it is desired that the pressure shall be progressively reduced to 5 lbs. per square inch as the temperature of the outside air increases to 50° F., the loading means 18 will be set to maintain a pressure of 15 lbs. per square inch, and the thermostat springs will be adjusted to maintain a pressure of 5 lbs. per square inch when the temperature of the air is 50° F. At all intermediate temperatures the loading of the pressure actuated means 62 will be automatically varied in inverse relation to the air temperature.

Similarly, the device shown in Fig. 6 may be used to control the steam pressure of a fuel oil burning heating system in which the oil pump is steam operated. In such case it will of course be necessary to apply the pressure of the steam to the top of the pressure actuated means 67.

While the invention has been described in connection with heating apparatus, it is equally applicable to negative heating, or cooling apparatus where it is desired that the cooling effect shall vary with the outside temperature, as in air cooling systems for theaters and churches. A simple method of modifying the apparatus shown to suit it for use with a cooling system would be to shift the fulcrum of the lever 10 to the right-hand or free end of this lever, instead of having the fulcrum located between the lever yoke 13 and the connection 21, as shown. When this is done, the loading on the pressure actuated means 10 will be increased as the outside temperature rises, thus increasing the cooling effect. In such case it will be desirable to employ my invention with valves of the type used in cooling systems, such as valves for controlling the flow of ammonia, brine, and cold air.

While the invention has been described in considerable detail and specific forms shown in the drawings, it is to be understood that the invention may be otherwise embodied and employed in connection with the control of heating systems and the like, of various types other than those herein shown.

I claim:

1. An automatic pressure reducing valve comprising a main valve, pressure actuated means for operating said main valve, fluid conducting means leading from the inlet chamber of said main valve to one side of said pressure actuated means, an automatic pilot valve for controlling the passage of fluid through said conducting means, said pilot valve being operated in one direction by a spring and being operated in the opposite direction by the pressure on the outlet side of said main valve, and thermostatic means for offsetting the effect of said spring independently of the pressure on the outlet side of said main valve so as to change the fluid pressure on the outlet side of said main valve.

2. An automatic pressure reducing valve comprising a main valve, pressure actuated means for operating said main valve, fluid conducting means leading from the inlet chamber of said main valve to one side of said pressure actuated means, an automatic pilot valve for controlling the passage of fluid through said conducting means, said pilot valve being operated in one direction by the pressure on the outlet side of said main valve and being operated in the opposite direction by a loading means, and thermostatic means for altering the loading of said pilot valve independently of the pressure on the outlet side of said main valve so as to change the fluid pressure on the outlet side of said main valve.

3. A pneumatic thermostat comprising a body, a flexible diaphragm attached to said body, vapor tension means for moving said diaphragm in one direction, a disk coacting with said diaphragm, a lever yoke coacting with said disk, a spring yoke coacting with said lever yoke, a plurality of spiral springs interposed between said body and said spring yoke, and a lever pivoted to said body and actuated by said lever yoke.

4. In a device of the character indicated, a control member, fluid actuated means for moving said control member in one direction, loading means acting in opposition to said fluid actuated means for moving said control member in another direction, a thermostatic device including an actuating lever, spring means for urging said lever in one direction, thermostatic means for urging said lever in opposition to said spring means in the opposite direction, connecting means between said lever and a part of said loading means, said connecting means including a spring whereby when said lever moves in one direction said spring will be stressed and vary said loading means.

5. An automatic pressure reducing valve means, comprising a main valve, a fluid pressure actuated member for controlling said main valve, means for conducting pressure fluid to both sides of said member, a pilot valve for controlling the flow of pressure fluid at one side of said member and urged in one direction by fluid pressure, loading means for said pilot valve, and thermostatic means independent of said last mentioned fluid pressure for varying the loading on said pilot valve.

6. A temperature control device comprising a body, fluid pressure actuated means coacting with said body and actuated by fluid pressure in one direction, loading means for actuating said pressure actuated means in the opposite direction, a pneumatic thermostat comprising a flexible diaphragm, vapor tension means for moving said diaphragm in one direction, and a spring for moving said diaphragm in the opposite direction, and a lever connecting said diaphragm and said loading means, whereby the loading of said pressure actuated means will be varied substantially continuously in accordance with the temperature at a particular point.

7. An automatic pressure reducing valve comprising a main valve, pressure actuated means for actuating said main valve, fluid conducting means for conducting pressure fluid on one side of said pressure actuated means, an automatic pilot valve for controlling the passage of fluid through said conducting means, means for conducting pressure fluid from the outlet side of said main valve to said pilot valve for actuating the same in one direction, loading means for actuating said pilot valve in the opposite direction, and thermostatic means for altering the loading of said pilot valve independently of the pressure on the outlet side of said main valve so as to change the fluid pressure on the outlet side of said main valve.

8. An automatic pressure reducing valve comprising a main valve, pressure actuated means for operating said main valve, pressure fluid conducting means leading to one side of said main valve, an automatic pilot valve for controlling the passage of fluid through said conducting means, said pilot valve being operable in one direction by loading means, and operable in another direction by fluid pressure, and thermostatic means for altering the loading means of said pilot valve independently of the pressure of the fluid for operating said pilot valve in said direction.

9. An automatic reducing valve comprising, a main valve, fluid pressure actuated means for actuating said main valve, a pilot valve, means for conducting pressure fluid from the high pressure side of said main valve to the inlet side of said pilot valve, means for conducting pressure fluid from the outlet side of said pilot valve to one side of said fluid pressure actuated means, means for bleeding pressure fluid from said fluid pressure actuated means to the low pressure side of said main valve, loading means for said pilot valve, means for conducting pressure fluid to said pilot valve for actuating the same in one direction, and thermostatic means for varying said loading means for said pilot valve.

10. An automatic pressure reducing valve, comprising a main valve, fluid pressure actuated means for moving said main valve in one direction, pressure fluid conducting means leading to one side of said fluid pressure actuated means, a pilot valve for controlling the passage of fluid through said conducting means, loading means for said pilot valve for urging the same in one direction, fluid pressure means for urging the same in the other direction, and means independent of said last mentioned fluid pressure means for automatically varying the effective loading means on said pilot valve for the purpose described.

PAULSEN SPENCE.